R. D. BASSETT.
PROCESS OF RECOVERING AND GRADING GASOLENE.
APPLICATION FILED MAR. 14, 1914.
1,120,669.
Patented Dec. 15, 1914.
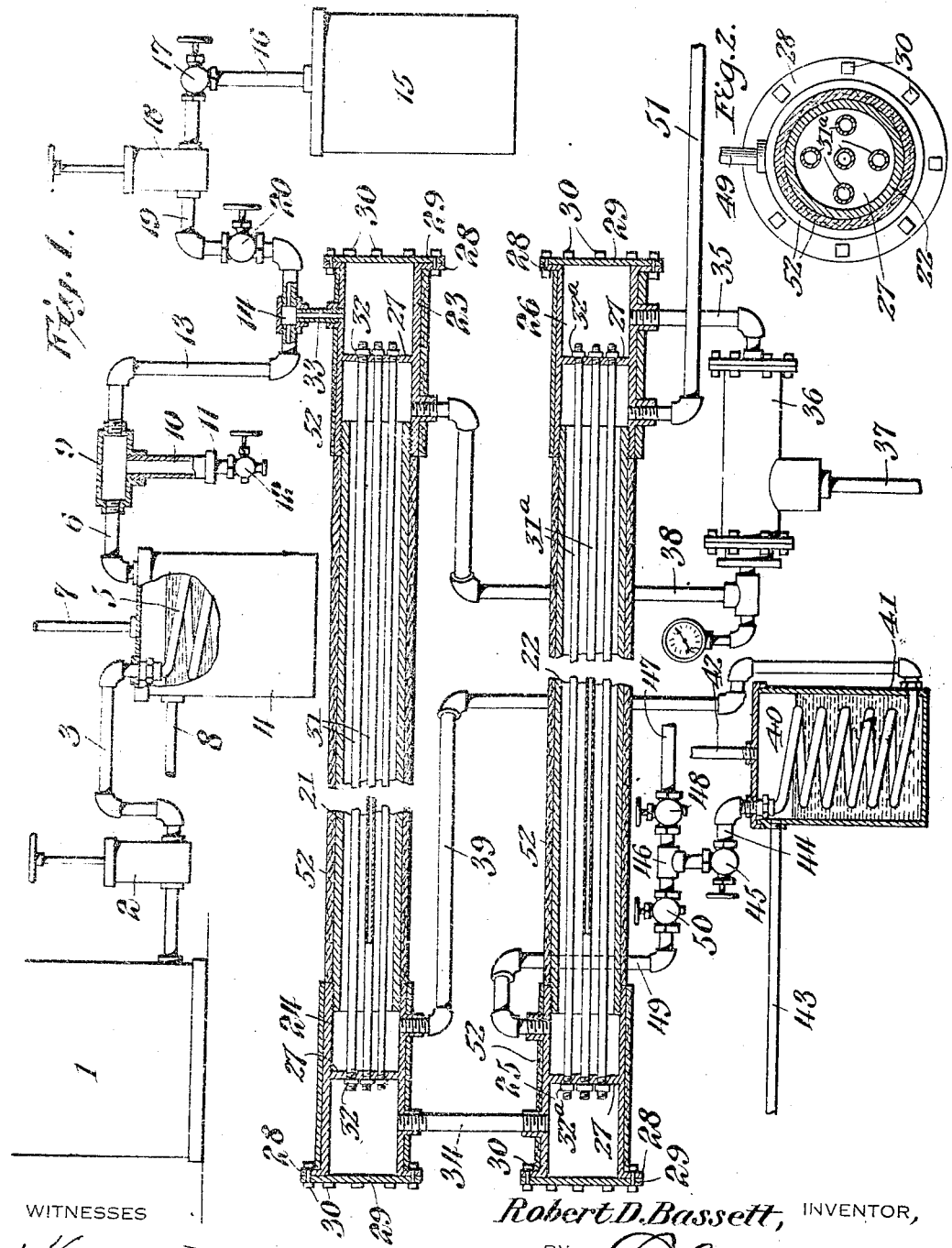
WITNESSES
Howard D. Orr.
F. T. Chapman.
Robert D. Bassett, INVENTOR,
BY E. G. Siggers.
ATTORNEY

UNITED STATES PATENT OFFICE.

ROBERT D. BASSETT, OF KINZUA, PENNSYLVANIA, ASSIGNOR OF ONE-THIRD TO KARL A. KRANTZ, OF KINZUA, PENNSYLVANIA, AND ONE-THIRD TO HENRY H. BASSETT, OF GRAND VALLEY, PENNSYLVANIA.

PROCESS OF RECOVERING AND GRADING GASOLENE.

1,120,669.   Specification of Letters Patent.   Patented Dec. 15, 1914.

Application filed March 14, 1914. Serial No. 683,742.

*To all whom it may concern:*

Be it known that I, ROBERT D. BASSETT, a citizen of the United States, residing at Kinzua, in the county of Warren and State of Pennsylvania, have invented a new and useful Process of Recovering and Grading Gasolene, of which the following is a specification.

This invention has reference to improvements in the process of recovering and grading gasolene, whereby gasolene of any desired degree of specific gravity may be produced without the necessity of resorting to the wasteful methods now employed, especially where it is desired to produce a gasolene of lower degree from a high degree gasolene or from the gas from which the latter may be produced.

In accordance with the present invention a gasolene of the desired degree of specific gravity is produced by mixing light high-grade gasolene, that is, gasolene of high degree Baumé, and gas from which such gasolene is taken, but which is still rich in gasolene, or the rich gas before the high-degree gasolene is taken therefrom, with a relatively heavy or low-degree hydrocarbon, usually in the form of a gasolene of low-grade Baumé, the proportions employed being such as to produce a blend of the desired degree from the high and low degree gasolenes.

The result of the process of the present invention is that there is obtained a greater output of gasolene from the rich gas than has heretofore been the case, while the blend of gasolenes constituting the gasolene of medium grade or degree is reliably stable.

The great inflammability of high degree gasolene because it is so highly volatile, and the consequent danger to life and property in handling such gasolene has caused the railroads and other common carriers to adopt regulations with respect to the degree of specific gravity of the gasolene which will be accepted for transportation. Many common carriers refuse to transport gasolene which is higher than seventy-eight or eighty degrees, wherefore the shipper must reduce his high degree gasolene, say of ninety-one degrees, to seventy-eight or eighty degrees, and this has generally been done by permitting a portion of the gasolene to evaporate, which means considerable waste which is obviated by the present invention.

The process will be best understood from a consideration of the following detailed description, taken in connection with the accompanying drawings indicating an apparatus by which the process may be practised, but it will be understood that the process is not necessarily limited to the use of the apparatus disclosed, nor to the exact procedure described, wherefore it will be further understood that the invention is susceptible of various changes and modifications so long as such changes and modifications do not mark a material departure from the salient features of the invention.

In the drawings:—Figure 1 is a diagram with some parts in elevation indicating an apparatus whereby the process may be carried out. Fig. 2 is a cross section of one of the mixing and condensing devices.

In the drawings there is shown a reservoir 1 which may be assumed to be of suitable capacity, and which is to be taken as indicative of any suitable source, such as a well or tank, of gas productive of high degree gasolene. In the subsequent treatment the gas, and the high degree gasolene when present, are under considerable pressure, say about one hundred and forty pounds per square inch, and this is typified in the drawings by a pump 2 connected to the reservoir or tank 1, and from the pump the compressed gas passes by a pipe 3 into a cooling device 4, when it is desired to first condense high degree gasolene from the gas. The cooling device may consist of a simple casing inclosing a coil 5 connected at one end to the pipe 3 and at the other end to another pipe 6, a cooling fluid, such as water, entering the casing 4 through a pipe 7 and escaping through a pipe 8, all the parts being more or less typical of any suitable apparatus for the purpose. After passing through the cooler 4 when included in the system, the high degree gasolene with the accompanying gas is conveyed through a casing 9 provided with a bottom extension 10 terminating in a reducing coupling 11 to which is connected a valve 12, so that any water or the like which may reach the casing 9 will find its way into the extension 10 and from time to time may be drawn off through the valve 12. Leading out from the casing 9 is a pipe 13 ultimately terminating at a T coupling 14. There is also indicated a reservoir or tank 15, which may be taken as typical of any suitable supply of low degree gasolene or high degree kerosene, either of which may be considered as a relatively heavy low-grade hydrocarbon liquid, and while reference will hereinafter be made particularly to low degree gasolene, it will be understood without further explanation that under some circumstances high degree kerosene may be employed in place of the low degree gasolene. The reservoir 15 is connected by a pipe 16 through a valve 17 to a pump 18, and the latter is connected by a pipe 19 through a valve 20 to the T 14. The pump 18 is to be taken as typical of any suitable means for supplying the low degree gasolene to the T 14 under suitable pressure, and the quantity of low degree gasolene supplied in any unit of time is controllable by the valves 17 and 20, the latter serving to wholly cut-off the supply between the pump 18 and the T 14 when desired. There are also provided two elongated casings 21 and 22, respectively, which may be generally alike. The casing 21 is screwed at the ends into hollow heads 23, 24, respectively, and the casing 22 is screwed at the ends into other hollow heads 25, 26, respectively, the several heads being substantially alike, and each is provided with an intermediate diaphragm or division wall 27, while the end of each head remote from that into which the respective casing 21 or 22 is screwed is formed with a circumferential flange 28 designed to receive a cap plate 29 held in place by bolts 30.

It will be understood that, both in the parts already described and in the parts to be described, suitable provision is made by packing or otherwise for preventing leakage, it being deemed unnecessary to either show or describe any means for such purpose.

Each diaphragm or division wall 27 is traversed by a suitable number of passages through which extend corresponding ends of pipes 31, these pipes being held in place by nuts 32, and each pipe opens into a chamber formed between the respective diaphragm 27 and cap 29. There is no communication between the interior of the casing 21 or 22 and the terminal chambers in the heads at the ends of the casings formed between the diaphragms 27 and the caps 29, but the chamber at one end of each casing 21 or 22 is in constant communication with the like chamber at the other end thereof through the pipes 31, the latter being grouped in spaced relation one to the other and to the walls of the respective casing through which they pass.

The T 14 is connected with the interior of the terminal chamber within the head 23 by a pipe 33. The terminal chamber within the head 24 is connected to the like terminal chamber within the head 25 by a pipe 34, and leading from the terminal chamber within the head 26 is a pipe 35 entering one end of a separator 36 designed to separate liquid gasolene from the gas accompanying it, and since this separator is of known construction, it is neither shown nor described in detail. The liquid gasolene leaves the separator 36 by a pipe 37, while the lean gas leaves the separator by a pipe 38, which in turn is connected with the head 23 on the side of the diaphragm 27 therein remote from the cap 29, so that the gas will flow through the casing 21 about the pipes 31 to the head 24, whence the gas passes out of the casing by way of a pipe 39 leading to a coil 40 within a casing 41 similar to the coil 5 within the casing 4. The casing 41 may receive a heating medium through a pipe 42, and such heating medium after performing its office may escape from the casing 41 by way of a pipe 43. The gas becomes chilled by expansion and, therefore, the heating coil 40 is employed to prevent freezing of certain valves through which the gas is subsequently conducted. That end of the coil 40 remote from the pipe 39 is connected to a pipe 44 including a valve 45, and the pipe 44 terminates at a T 46 from one side of which there is branched a pipe 47 including a valve 48, and from the other side of which there is branched a pipe 49 including a valve 50. The pipe 49 is connected with the interior of the head 25 on the side of the diaphragm 27 remote from the cap 29, so that gas entering the head 25 by way of the pipe 49 has free access to the interior of the casing 22 about the pipes 31 therein. Leading from the head 26 at that end communicating with the casing 22 is a pipe 51.

In carrying out the process the high degree gasolene together with the gas out of which it is made, or the rich gas before the high degree gasolene has been condensed, as the case may be, flows at a pressure of from one hundred and twenty to one hundred and forty pounds, although not confined to any exact amount, into the chamber within the head 23 between the diaphragm 27 and cap 29. The low degree gasolene is forced through the pipe 19 to and through the pipe 33, and thence into the same chamber within the head 23 as the high degree gasolene or gas where the two grades of gasolene or the gas and low degree gasolene become mixed, wherefore the chamber in question may be termed a mixing chamber. The mixture then passes through the pipes 31 traversing the casing 21 until the terminal chamber in the head 24 is reached, and thence by the pipe 34 into the terminal chamber of the head 25 and then through the pipes 31 traversing the casing 22 into the terminal chamber of the head 26, ultimately passing therefrom by the pipe 35 into the separator 36. The lean gas entering the pipe 38 passes into the interior of the casing 21, the pressure of one hundred and twenty to one hundred and forty pounds more or less being substantially maintained. The high degree gasolene and gas, or the rich gas alone, has, therefore, an opportunity to become thoroughly intermixed with the low degree gasolene in passing through the pipes 31 of the casing 21 at normal temperature. It is found advisable to somewhat warm the gas from the pipe 39 before reaching the pipe 49, wherefore the heating coil 40 is provided, for otherwise there is a liability of having the valve 45 freeze, since from this point on the gas is allowed to expand, and, therefore, becomes chilled to a low degree. The gas on entering the chamber 22 may still further expand, thus absorbing a great amount of heat and correspondingly cooling the pipes 31 traversing the casing 22, thereby cooling the gas and gasolene flowing through these pipes to a very low degree, wherefore a material amount of gasolene is condensed from the gas passing through said pipes even though high degree gasolene had previously been condensed from the same gas. Such lean gas as is not needed for cooling purposes may pass by way of the valve 48 into the pipe 47, and thence to a suitable point of disposal, and the gas which has traversed the casing 22 may likewise be carried by the pipe 51 to a suitable point of disposal.

Whatever be the desired degree of specific gravity of the gasolene to be produced, it is readily brought about by the mixing of high and low degree gasolene with such gas as may accompany the high degree gasolene, or mixing the rich gas before deposition of high degree gasolene with low degree gasolene, under compression, and subjecting the mixture to chilling due to the expansion of the lean gas allowed to flow in chilling relation to the mixture, so as to cause the condensation of gasolene from the rich or partially depleted gas, wherefore there is a material increase in the quantity of gasolene heretofore obtained, while the degree of specific gravity of the resultant gasolene is readily controllable.

The process makes it possible to produce any grade of gasolene desired without waste of material and with an actual increase in the amount of liquid gasolene obtained, since some of the gas heretofore allowed to escape is converted into gasolene. Moreover, existing supplies of high degree gasolene need not be evaporated to a considerable extent in order to lower the grade of the gasolene to the degree necessary for its acceptance by the common carriers, for by the present process not only is the high degree gasolene reduced to commercial standards but the quantity of gasolene is actually increased. The process is applicable to the raising of the grade of low degree gasolene or the lowering of a grade of gasolene of too high a degree, as may be desired.

It will be understood, of course, that while more than two casings 21 and 22, which are customarily cylindrical, and, therefore, may be termed cylinders without necessary limitation to such form, may be used by properly balancing the structures in coupling or connecting them, two such casings or cylinders are necessary since the high and low degree gasolene or the low degree gasolene and the rich gas must be given a chance to mix in one of the cylinders at normal temperature before the mixture is condensed by exposing it to extreme cold in the other casing or cylinder, and it is found that the employment of the high pressure gas around the pipes in the first cylinder while the mixture is becoming intimate produces the best results, for there is a marked reduction in the amount of gasolene obtained when the gas and the high and low degree gasolenes are not given a chance to thoroughly intermix in the manner stated. From actual experience it has been found that the present process produces approximately twice as much gasolene from a given quantity of gas as was heretofore produced by other processes.

The low degree specific gravity gasolene is preferably forced into the high degree gasolene or rich gas in the form of a spray, thereby producing a more intimate mixture and absorbing more or less of the gas not already taken up or condensed into high degree gasolene, while the product is, of course, of a degree of specific gravity due to the quantities of high degree gasolene or rich gas and low degree gasolene employed. Where the grade of the gasolene is reduced by evaporation, the loss is often as much as one-fifth of the volume, while by the present process not only is such hitherto wasted material retained, but a larger quantity of gasolene is obtained than has heretofore been obtained from the gas, and, moreover, the degree of specific gravity of the resultant gasolene is different from that which would represent the average of the mixture of the two grades of gasolene.

What is claimed is:—

1. The process of producing a blend of light high grade gasolene and a petroleum liquid heavier than such gasolene, but not heavier than high degree kerosene, which consists in intimately intermixing them in the presence of the gas from which the high grade gasolene is produced while all the ingredients named are under superatmospheric pressure, and then chilling the mixture so obtained.

2. The process of producing a stable blend of light high-grade and heavy low-grade gasolenes, which consists in intimately intermixing them under superatmospheric pressure and in the presence of gas rich in gasolene accompanying the high-grade gasolene, and then chilling the mixture so obtained.

3. The process of producing a marketable grade of gasolene from gas rich in gasolene, which consists in intimately intermixing a grade of gasolene lower than the desired marketable grade with the rich gas while both are under superatmospheric pressure, and then chilling the mixture so obtained while still under superatmospheric pressure.

4. The process of reducing the grade of light-grade gasolene without waste, which consists in blending low-grade gasolene therewith by introducing the low-grade gasolene into the high-grade gasolene while both are under superatmospheric pressure, causing an intimate intermixture thereof, and then chilling the same while still under superatmospheric pressure.

5. The process of producing a marketable and stable grade of gasolene which consists in forcing gasolene of relatively low-degree Baumé into gasolene of high-degree Baumé and gas rich in gasolene and while both are under superatmospheric pressure, causing an intimate intermixture thereof, then subjecting the mixture while still under superatmospheric pressure to low temperature, and finally separating the blend of gasolenes from the lean gas.

6. The process of producing a marketable and stable grade of gasolene, which consists in producing gasolene from gas rich in gasolene, then cooling the gasolene and gas while still together, then forcing gasolene of relatively low degree Baumé into the cooled gas and gasolene and causing an intimate intermixture thereof, then subjecting the mixture while still under superatmospheric pressure to low temperature, and finally separating the blend of gasolenes from the lean gas.

7. The process of producing marketable and stable gasolene, which consists in directing gasolene of high degree Baumé together with rich gas from which such gasolene is producible through a conduit under superatmospheric pressure, directing gasolene of relatively low degree Baumé into the same conduit in the same direction of travel as the first-named gasolene and gas, maintaining the gasolenes and gas in the conduit until an intimate intermixture is produced, and then chilling the mixture.

8. The process of producing marketable and stable gasolene from gas rich in gasolene, which consists in causing high degree gasolene, the accompanying rich gas and low degree gasolene to flow simultaneously and in the same direction through a conduit under superatmospheric pressure to produce an intimate intermixture thereof, and then chilling the mixture while still traveling in the same direction and under superatmospheric pressure.

9. The process of producing marketable and stable gasolene from gas rich in gasolene, which consists in simultaneously introducing such gas, gasolene condensed therefrom, and low degree gasolene, all under superatmospheric pressure into and causing them to travel in the same direction through a conduit until intimately intermixed, then chilling the gasolenes and gas while still traveling in the same direction and still under superatmospheric pressure to condense gasolene from the gas and stabilize the mixture, and finally separating the blend of the gasolenes from the lean gas.

10. The process of producing a stable gasolene of a desired degree of specific gravity, which consists in introducing low degree gasolene under superatmospheric pressure into gas rich in gasolene and high degree gasolene also under pressure, and causing condensation of gasolene from the gas and the blending of the gasolenes by the chilling action of the expansion of lean gas in operative relation to the mixture.

11. The process of producing gasolene, which consists in providing gas rich in gasolene under superatmospheric pressure, cooling the gas to condense gasolene therefrom, then introducing thereinto relatively low grade gasolene also under pressure, then causing the gas and gasolene to travel through a conduit surrounded by lean gas under pressure, then causing the mixture so produced to travel through a conduit surrounded by expanded lean gas to chill the mixture and thereby condense gasolene from the gas in the mixture, and finally separating the blend of gasolenes from the accompanying gas.

In testimony, that I claim the foregoing as my own, I have hereto affixed my signature in the presence of two witnesses.

ROBERT D. BASSETT.

Witnesses:
  J. W. GREEN,
  W. H. NEWTON.

Correction in Letters Patent No. 1,120,669.

It is hereby certified that in Letters Patent No. 1,120,669, granted December 15, 1914, upon the application of Robert D. Bassett, of Kinzua, Pennsylvania, for an improvement in "Processes of Recovering and Grading Gasolene," an error appears in the printed specification requiring correction as follows: In the headings to the specification and drawing, date of filing application, for "March 14, 1914," read *March 14, 1912;* and that the said Letters Patent should be read with this correction therein that the same may conform to the record of the case in the Patent Office.

Signed and sealed this 26th day of January, A. D., 1915.

[SEAL.]

R. F. WHITEHEAD,
*Acting Commissioner of Patents.*